United States Patent
Lee et al.

(10) Patent No.: US 11,343,170 B2
(45) Date of Patent: May 24, 2022

(54) REPEATER FOR PACKET TRANSMITTING IN MESH NETWORK

(71) Applicant: Arcadyan Technology Corporation, Hsinchu (TW)

(72) Inventors: Chih-Fang Lee, Hsinchu (TW); Tsung-Hsien Hsieh, Hsinchu (TW)

(73) Assignee: Arcadyan Technology Corporation

( * ) Notice: Subject to any disclaimer, the term of this patent is extended or adjusted under 35 U.S.C. 154(b) by 98 days.

(21) Appl. No.: 16/673,137

(22) Filed: Nov. 4, 2019

(65) Prior Publication Data

US 2020/0145322 A1 May 7, 2020

(30) Foreign Application Priority Data

Nov. 5, 2018 (TW) .................................. 107139218

(51) Int. Cl.
| | | |
|---|---|---|
| *H04L 45/18* | (2022.01) | |
| *H04W 76/15* | (2018.01) | |
| *H04W 76/14* | (2018.01) | |
| *H04W 76/11* | (2018.01) | |
| *H04B 7/155* | (2006.01) | |

(Continued)

(52) U.S. Cl.
CPC .......... *H04L 45/18* (2013.01); *H04B 7/15592* (2013.01); *H04W 40/10* (2013.01); *H04W 40/22* (2013.01); *H04W 52/0238* (2013.01); *H04W 52/46* (2013.01); *H04W 76/11* (2018.02); *H04W 76/14* (2018.02); *H04W 76/15* (2018.02)

(58) Field of Classification Search
CPC ...... H04L 45/18; H04W 76/15; H04W 76/14; H04W 76/11; H04W 40/10; H04W 40/22; H04W 52/0238; H04W 52/46; H04B 7/15592
See application file for complete search history.

(56) References Cited

U.S. PATENT DOCUMENTS

| | | | |
|---|---|---|---|
| 9,979,626 B2 | 5/2018 | Kish et al. | |
| 2007/0268846 A1 | 11/2007 | Proctor, Jr. et al. | |
| 2009/0046644 A1* | 2/2009 | Krishnaswamy | ... H04W 12/069 370/329 |
| 2010/0260146 A1* | 10/2010 | Lu | ....................... H04L 12/4633 370/331 |

(Continued)

FOREIGN PATENT DOCUMENTS

| | | |
|---|---|---|
| CN | 1007774 B | 4/1990 |
| WO | WO 2019001695 A1 * | 1/2019 |

OTHER PUBLICATIONS

Amod Pradhan, "Examination report No. 1 for standard patent application" for Application No. 2019261671, Australian Government, dated Jun. 18, 2020, pp. 1-4.

*Primary Examiner* — Ian N Moore
*Assistant Examiner* — Rushil Parimal Sampat
(74) *Attorney, Agent, or Firm* — Innovation Counsel LLP

(57) ABSTRACT

A repeater configured to be connected to a network is provided. The repeater includes an uplink wireless transmission interface, a downlink wireless transmission interface, and a processing unit. The uplink wireless transmission interface is configured to establish an external wireless connection with the network. The downlink wireless transmission interface is configured to perform data transmission with the uplink wireless transmission interface and has an external wireless transmission function. The processing unit is configured to turn off the external wireless transmission function of the downlink wireless transmission interface when the connection between the uplink wireless transmission interface and the network is disconnected.

12 Claims, 6 Drawing Sheets

(51) Int. Cl.
*H04W 40/10* (2009.01)
*H04W 40/22* (2009.01)
*H04W 52/02* (2009.01)
*H04W 52/46* (2009.01)

(56) References Cited

U.S. PATENT DOCUMENTS

| | | | |
|---|---|---|---|
| 2012/0264369 A1* | 10/2012 | Wang | H04B 7/15528 455/11.1 |
| 2019/0069188 A1* | 2/2019 | Lumbatis | H04W 28/08 |
| 2020/0145176 A1* | 5/2020 | Hencinski | H04L 1/1861 |
| 2020/0305043 A1* | 9/2020 | Chen | H04B 17/318 |

* cited by examiner

REPEATER FOR PACKET TRANSMITTING IN MESH NETWORK

This application claims the benefit of Taiwan application Serial No. 107139218, filed Nov. 5, 2018, the subject matter of which is incorporated herein by reference.

BACKGROUND OF THE INVENTION

Field of the Invention

The invention relates in general to a repeater for a network.

Description of the Related Art

Mesh network is a wireless network architecture that has gained a great popularity. The nodes of the mesh networks having the features of self-configuration and self-organization can be freely connected to each other, and the topology of the network can be dynamically changed in response to the change in the connection between the nodes.

However, if the nodes of a mesh network are arbitrarily connected, the phenomenon of packet looping may occur, making a packet being transmitted and circulated in a loop path and not being transmitted to an external network or delaying the transmission of the packet to the external network. The user, when connecting to a network island like what is mentioned above, will not obtain the network service. Therefore, it has become a prominent task for the industries to provide an effective solution to resolve the above problem.

SUMMARY OF THE INVENTION

The invention is directed to a repeater for a network capable of effectively avoiding the phenomenon of packet looping.

According to one embodiment of the present invention, a repeater configured to be connected to a network is provided. The repeater includes an uplink wireless transmission interface, a downlink wireless transmission interface, and a processing unit. The uplink wireless transmission interface is configured to establish an external wireless connection with the network. The downlink wireless transmission interface is configured to perform data transmission with the uplink wireless transmission interface and has an external wireless transmission function. The processing unit is configured to turn off the external wireless transmission function of the downlink wireless transmission interface when the uplink wireless transmission interface is disconnected from the network.

According to another embodiment of the present invention, a repeater for a mesh network for being connected to a network is provided. The repeater includes a processing unit, an uplink wireless transmission interface, and a downlink wireless transmission interface. The uplink wireless transmission interface and the downlink wireless transmission interface are controlled by the processing unit. The uplink wireless transmission interface is configured to directly establish a connection with the network or to firstly establish a back-haul connection with a first repeater and then establish a connection with the network through the first repeater. The downlink wireless transmission interface is configured to provide a back-haul wireless network access ID and a front-haul wireless network access ID. The back-haul wireless network access ID allows a second repeater to establish a back-haul connection with the downlink wireless transmission interface. The front-haul wireless network access ID allows a user device to establish a front-haul connection with the downlink wireless transmission interface. When the uplink wireless transmission interface is disconnected from the network, the processing unit hides the back-haul wireless network access ID to turn off the function of the downlink wireless transmission interface allowing the second repeater to establish the back-haul connection.

According to an alternate embodiment of the present invention, a repeater for a mesh network is provided. The mesh network includes a wired network transmission interface, an uplink wireless transmission interface, a downlink wireless transmission interface, and a processing unit. The repeater is connected to a network through the wired network transmission interface or the uplink wireless transmission interface. The downlink wireless transmission interface is configured to provide a wireless network access ID. The wireless network access ID allows another repeater to establish a back-haul connection or a user device to establish a front-haul connection. The processing unit is configured to hide the wireless network access ID to turn off the connection function of the downlink wireless transmission interface when the repeater is disconnected from the network.

According to another alternate embodiment of the present invention, a repeater configured to be connected to a network is provided. The repeater includes an uplink wireless transmission interface, a downlink wireless transmission interface, and a processing unit. The uplink wireless transmission interface is configured to directly establish an external wireless connection with the network or to firstly establish a connection with a first repeater and then establish a connection with the network through the first repeater. The downlink wireless transmission interface is configured to perform data transmission with the uplink wireless transmission interface and has an external wireless transmission function. The processing unit is configured to turn on the external wireless transmission function of the downlink wireless transmission interface only when the uplink wireless transmission interface establishes an external wireless connection with the network or the first repeater.

The above and other aspects of the invention will become better understood with regard to the following detailed description of the preferred but non-limiting embodiment (s). The following description is made with reference to the accompanying drawings.

DETAILED DESCRIPTION OF THE INVENTION

For the technical features of the present invention to be clearly understood, a number of exemplary embodiments are disclosed below with detailed descriptions. However, the exemplary embodiments are for explanatory and exemplary purposes only, not for limiting the scope of protection of the present invention.

Figure 1:
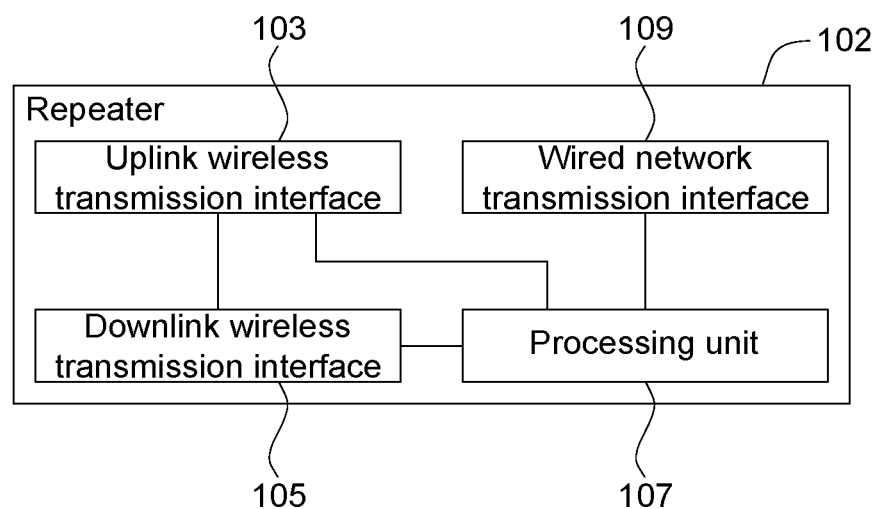
FIG. 1 is a block diagram of a repeater according to an embodiment of the present disclosure.

Referring to FIG. 1, a block diagram of a repeater according to an embodiment of the present disclosure is shown. The repeater 102 is adapted for being connected to a network. The repeater 102 includes an uplink wireless transmission interface 103, a downlink wireless transmission interface 105, and a processing unit 107. The uplink wireless transmission interface 103 is configured to establish an external wireless connection with the network. The downlink wireless transmission interface 105 is configured to perform data transmission with the uplink wireless transmission interface 103 and has an external wireless transmission function. The processing unit 107 is configured to turn off the external wireless transmission function of the downlink wireless transmission interface 105 when the uplink wireless transmission interface 103 is disconnected from the network.

Thus, when the uplink wireless transmission interface 103 is disconnected from the network, the external wireless transmission function of the downlink wireless transmission interface 105 is turned off, such that the phenomenon of packet looping between the repeater 102 and other repeaters can be effectively avoided, and the situation that the packet will be transmitted and circulated in a loop path so that the packet cannot be transmitted to the network or will be transmitted with delay will be avoided.

Alternatively, the repeater 102 mentioned above may further include a wired network transmission interface 109 configured to be externally connected to a network. The processing unit 107 is further configured to turn off the external wireless transmission function of the downlink wireless transmission interface 105 when the wired network transmission interface 109 and the uplink wireless transmission interface 103 both are disconnected from the network.

The uplink wireless transmission interface 103 and the downlink wireless transmission interface 105 both are a Wi-Fi transmission interface. The uplink wireless transmission interface 103 is configured to establish an external wireless connection with a first repeater, and the downlink wireless transmission interface 105 is further configured to provide a wireless network access ID. The wireless network access ID allows a second repeater to establish an external wireless connection with the downlink wireless transmission interface 105. The wireless network access ID can be, for example, a service set identifier (SSID).

In another embodiment, the uplink wireless transmission interface 103 is configured to establish an external wireless connection with a first repeater, and the downlink wireless transmission interface 105 is further configured to provide a back-haul wireless network access ID and a front-haul wireless network access ID. The back-haul wireless network access ID allows the second repeater to establish a connection with the downlink wireless transmission interface 105. The front-haul wireless network access ID allows a user device to establish a connection with the downlink wireless transmission interface 105.

The processing unit 107 is further configured to hide the back-haul wireless network access ID and the front-haul wireless network access ID of the downlink wireless transmission interface 105 to turn off the external wireless transmission function of the downlink wireless transmission interface 105 when the uplink wireless transmission interface 103 is disconnected from the network.

The back-haul wireless network access ID and the front-haul wireless network access ID can respectively be a back-haul service set identifier and a front-haul service set identifier.

Besides, the processing unit 107 is further configured to restore the external wireless transmission function of the downlink wireless transmission interface 105 when the connection between the uplink wireless transmission interface 103 and the network is restored. The repeater 102 is adapted to be used in a mesh network. In the following descriptions, the wireless network access ID is exemplified by a service set identifier (SSID), and the back-haul wireless network access ID and the front-haul wireless network access ID respectively are exemplified by a back-haul service set identifier and a front-haul service set identifier. Detailed descriptions are disclosed below.

Figure 2A:
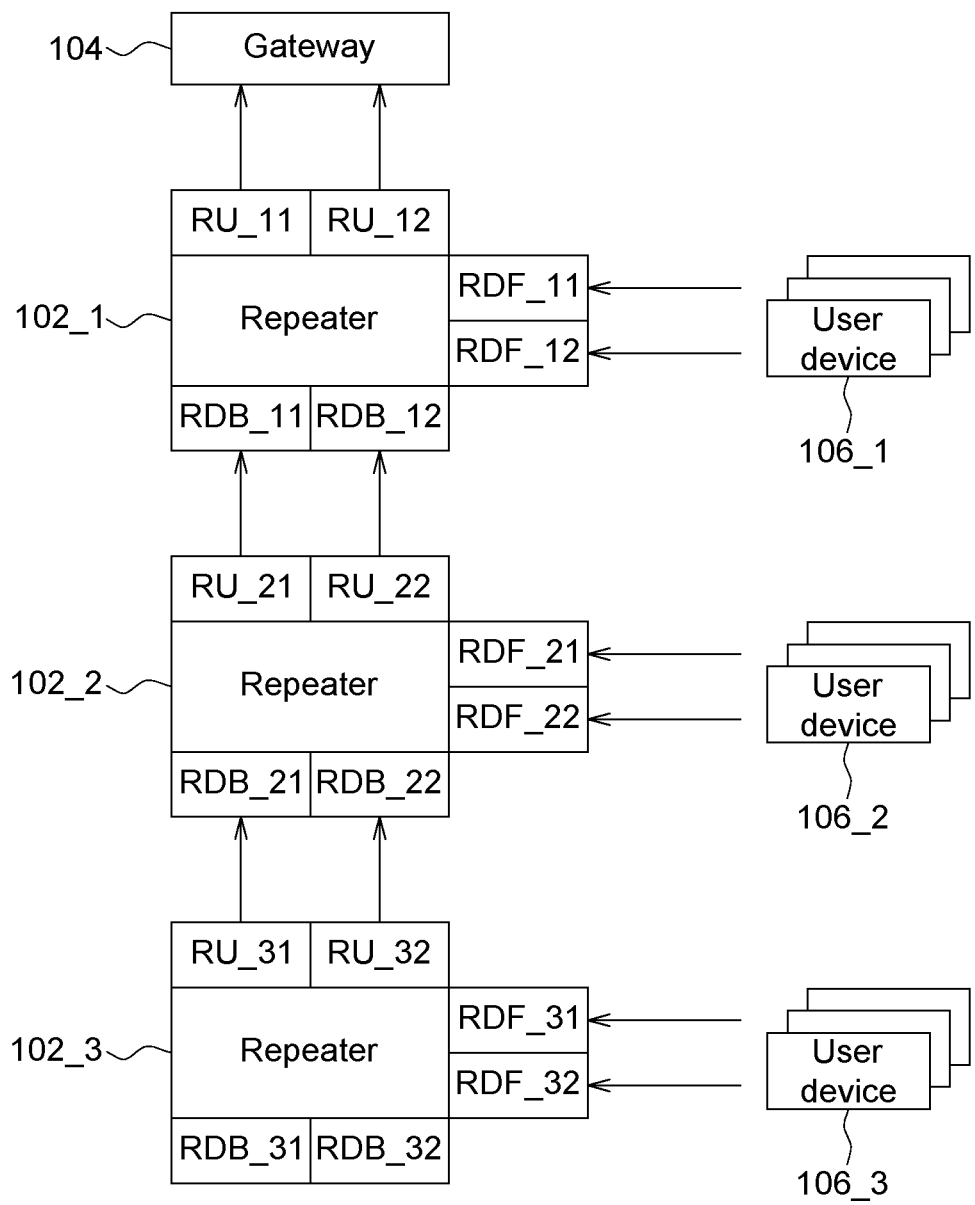
FIG. 2A is a schematic diagram of an example of a mesh network.

Referring to FIG. 2A, a schematic diagram of an example of a mesh network 100 is shown. The mesh network 100 includes three repeaters 102_1~102_3, a gateway 104 and three user devices 106_1~106_3. Different repeaters 102_1~102_3 can be connected through a wired connection and/or wireless connection for receiving or transmitting data. The repeaters 102_1~102_3 can further be used as access point (AP) devices which provide wireless service to the user devices (such as the user devices 106_1~106_3). The user devices 106_1~106_3 can be, for example, mobile devices, set-top boxes, personal computers, TV, tablets, mobile phones or other devices with wireless communication function.

Although FIG. 2A illustrates three repeaters, a gateway and three user devices, the number and connection of the devices illustrated in FIG. 2A are not for limiting the present disclosure. Generally, the number and connection of the devices are not specified.

In the example of FIG. 2A, each of the repeaters 102_1~102_3 respectively includes an uplink wireless transmission interface 103, a downlink wireless transmission interface 105 (such as a Wi-Fi transmission interface) and a wired network transmission interface 109 (such as an Ethernet transmission interface). Each of the uplink wireless transmission interface 103 and the downlink wireless transmission interface 105 of each of the repeaters 102_1~102_3 includes at least one wireless transmission port. For example, the uplink wireless transmission interface 103 includes at least one uplink wireless transmission port RU, and the downlink wireless transmission interface 105 includes at least one downlink wireless transmission port RD.

For example, the repeater 102_1 includes uplink wireless transmission ports RU_11 and RU_12 respectively using 2.4G and 5G frequency bands; the repeater 102_2 includes uplink wireless transmission ports RU_21 and RU_22 respectively using 2.4G and 5G frequency bands; the repeater 102_3 includes uplink wireless transmission ports RU_31 and RU_32 respectively using 2.4G and 5G frequency bands. The repeater 102_1 further includes downlink wireless transmission ports RDF_11 and RDF_12 respectively using 2.4G and 5G frequency bands (both using a front-haul service set identifier) and downlink wireless transmission ports RDB_11 and RDB_12 respectively using 2.4G and 5G frequency bands (both using a back-haul service set identifier). The repeater 102_2 further includes downlink wireless transmission ports RDF_21 and RDF_22 respectively using 2.4G and 5G frequency bands (both using a front-haul service set identifier) and downlink wireless transmission ports RDB_21 and RDB_22 respectively using 2.4G and 5G frequency bands (both using a back-haul service set identifier). The repeater 102_3 further includes downlink wireless transmission ports RDF_31 and RDF_32 respectively using 2.4G and 5G frequency bands (both using a front-haul service set identifier) and downlink wireless transmission ports RDB_31 and RDB_32 respectively using 2.4G and 5G frequency bands (both using a back-haul service set identifier).

The gateway 104 can provide a gateway service (such as an Internet access service or a service for connecting to a wired network or a wireless network) to the repeater 102_1. The uplink wireless transmission ports RU_11 and RU_12 of the repeater 102_1 can be connected to the gateway 104 for transmitting the uplink data to the gateway 104. On the other hand, the downlink wireless transmission ports RDB_11 and RDB_12 of the repeater 102_1 are connected to the repeater 102_2 for transmitting the downlink data to the repeater 102_2. Furthermore, the downlink wireless transmission ports RDF_11 and RDF_12 of the repeater 102_1 are connected to the user device 106_1 for transmitting the downlink data to the user device 106_1.

The uplink wireless transmission ports RU_21 and RU_22 of the repeater 102_2 are connected to the repeater 102_1 for transmitting the uplink data to the downlink wireless transmission ports RDB_11 and RDB_12 of the repeater 102_1. On the other hand, the downlink wireless transmission ports RDB_21 and RDB_22 of the repeater 102_2 are connected to the repeater 102_3 for transmitting the downlink data to the repeater 102_3. Furthermore, the downlink wireless transmission ports RDF_21 and RDF_22 of the repeater 102_2 are connected to the user device 106_2 for transmitting the downlink data to the user device 106_2.

The repeater 102_3 is connected to the repeater 102_2 through the uplink wireless transmission ports RU_31 and RU_32 for transmitting the uplink data to the repeater 102_2. On the other hand, the repeater 102_3 transmits the downlink data to another repeater (not shown) through the downlink wireless transmission ports RDB_31 and RDB_32. Besides, the repeater 102_3 communicates with the user device 106_3 through the downlink wireless transmission ports RDF_31 and RDF_32, and transmits the downlink data to the user device 106_3 through the downlink wireless transmission ports RDF_31 and RDF_32.

The mesh network 100 is a dynamic network. The service set identifiers provided by all repeater 102 (such as the repeaters 102_1, 102_2, 102_3) of the mesh network 100 are the same (for example, the front-haul service identifiers of all repeaters are the same, and the back-haul service identifiers of all repeaters are also the same). When a user device 106 (such as the user devices 106_1, 106_2, and 106_3) intends to establish a connection, the user device 106 will firstly scan the devices available for performing wireless connection. If the service set identifier (such as the front-haul service identifier) can be read and the signal strength indication (RSSI) of the received wireless signal is greater than a threshold, then the user device 106 will perform wireless connection with a corresponding repeater 102. For example, if the user device 106_2 detects the front-haul service identifier of the repeater 102_2 and the RSSI of the wireless signal received by the user device 106_2 from the repeater 102_2 is greater than the threshold, then the user device 106_2 can perform wireless connection with the repeater 102_2.

Similarly, when a repeater 102 (such as the repeater 102_1, 102_2, 102_3) intends to establish a connection with other repeaters or a gateway, the repeater 102 will firstly scan the devices available for performing wireless connection. If the service set identifier (such as the back-haul service identifier) can be read and the RSSI of the received wireless signal is greater than the threshold, then the user device 106 will perform wireless connection with the corresponding repeater. For example, if the repeater 102_2 detects the back-haul service identifier of the repeater 102_1 and the RSSI of the wireless signal received by the repeater 102_2 from the repeater 102_1 is greater than the threshold, then the repeater 102_2 can perform wireless connection with the repeater 102_1.

When the connection of the nodes in a network changes, the topology of the network will change accordingly. When the wireless connection between the repeater 102_2 and the repeater 102_1 is disconnected, the repeater 102_2 can no longer be connected to the gateway 104 through the repeater 102_1 and the repeater 102_2 cannot be connected to an external network through the gateway 104. Furthermore, if the repeater 102_2 detects the back-haul service identifier of the repeater 102_3 and the RSSI of the wireless signal received by the repeater 102_2 from the repeater 102_3 is greater than the threshold, then the repeater 102_2 performs wireless connection with the repeater 102_3. For example, when the uplink wireless transmission ports RU_21 and RU_22 of the repeater 102_2 perform wireless connection with the downlink wireless transmission ports RDB_31 and RDB_32 of the repeater 102_3, the phenomenon of packet looping will occur between the repeater 102_2 and the repeater 102_3. That is, after the packet is uploaded to the repeater 102_2 from the repeater 102_3, the packet will be uploaded to the repeater 102_3 from the repeater 102_2, and a loop will be generated. Under such circumstance, the packet transmitted to the repeater 102_2 from the user device 106_2 will be recursively transmitted between the repeater 102_2 and the repeater 102_3 and cannot be transmitted to an external network. Under some circumstances, the user device 1062, which mistakenly believes that the repeater 102_2 is already connected to another repeater, would assume that the network connection is normal and cannot find out the reason why the packet cannot be transmitted to the external network. Or, the packet transmitted to the repeater 102_2 from the user device 106_2 will not be transmitted to the external network until the connection between the repeater 102_2 and the repeater 102_1 is restored. However, the transmission of the packet will be delayed.

To avoid the above situation, according to the embodiment of this disclosure, when the uplink connection of the repeater is disconnected (that is, when the uplink wireless transmission interface is disconnected from the network), the repeater will turn off the external wireless transmission function of the downlink wireless transmission interface to effectively avoid the phenomenon of packet looping mentioned above. For example, if the external wireless transmission function of the downlink wireless transmission interface of the repeater 102_2 is turned off whenever the wireless connection between the repeater 102_2 and the repeater 102_1 is disconnected, the repeater 102_3 will not be able to perform wireless connection with the repeater 102_2 and the phenomenon of packet looping mentioned above will be avoided. Furthermore, when the connection between the uplink wireless transmission interface of the repeater 102_3 and the repeater 102_2 is disconnected, the repeater 102_3 will turn off the external wireless transmission function of the downlink wireless transmission interface. Thus, the uplink wireless transmission interface of the repeater 102_2 will not perform wireless transmission with the downlink wireless transmission interface of the repeater 102_3, and the phenomenon of packet looping, which would otherwise occur if the uplink wireless transmission interface of the repeater 102_2 performs wireless connection with the downlink wireless transmission interface of the repeater 102_3, will therefore be avoided.

Figure 2B:
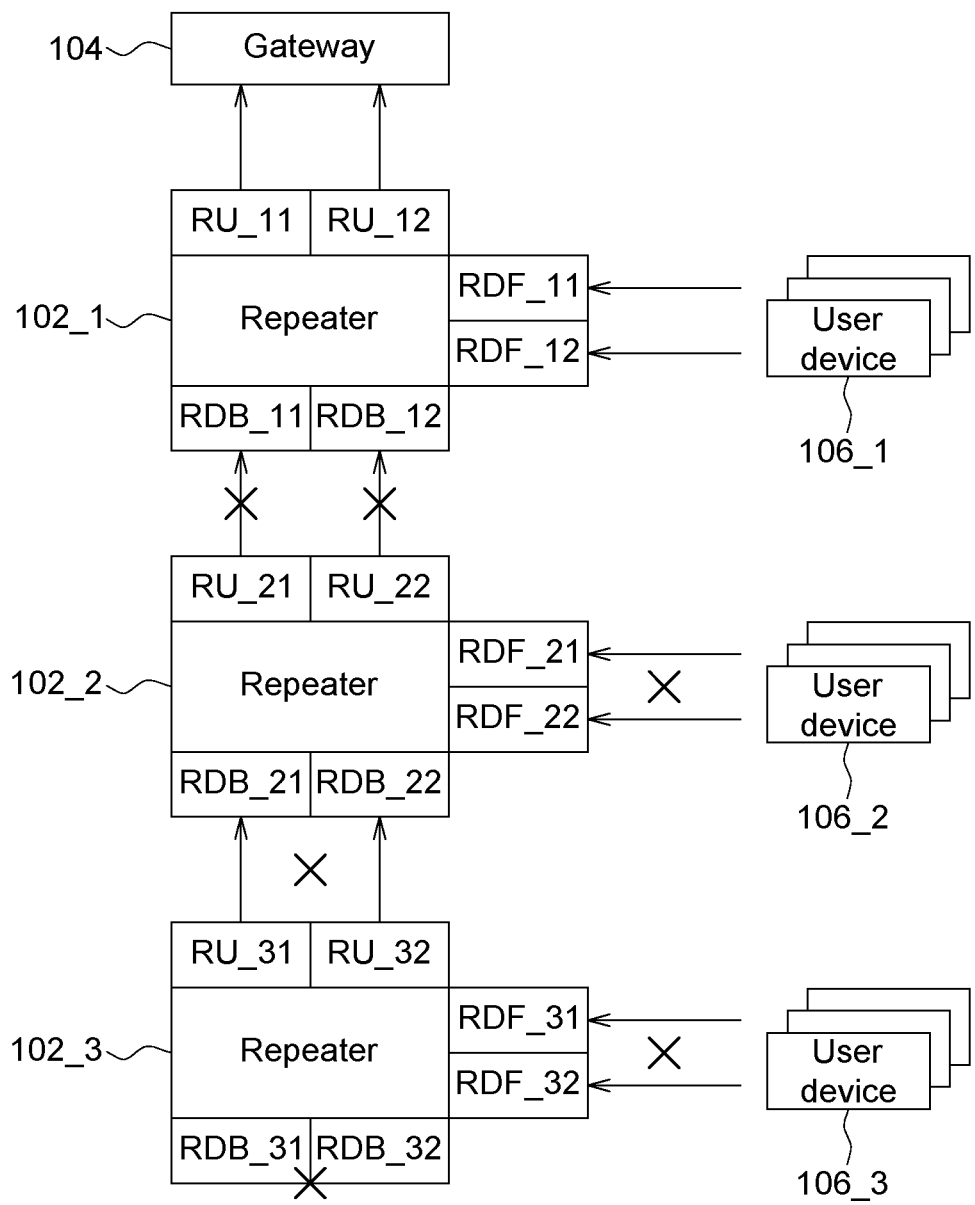
FIG. 2B is a schematic diagram of an example of the mesh network of FIG. 2A using the repeater of FIG. 1 of the present disclosure.

Referring to FIG. 2B, a schematic diagram of an example of the mesh network of FIG. 2A using the repeater of FIG. 1 of the present disclosure is shown. When the uplink connection of the repeater 102_2 is disconnected, that is the network connection between the repeater 102_2 and the repeater 102_1 is disconnected, (for example, the connection between the uplink wireless transmission ports RU_21 and RU_22 of the repeater 102_2 and the downlink wireless transmission ports RDB_11 and RDB_12 of the repeater 102_1 is disconnected), the repeater 102_2 will turn off the external wireless transmission function of the downlink wireless transmission ports RDB_21 and RDB_22. That is, the downlink connection using the back-haul service set identifier for data transmission will be turned off (that is, the network connection between the repeater 102_2 and the repeater 102_3 will be turned off). When the uplink wireless transmission ports RU_21 and RU_22 of the repeater 102_2 are disconnected from the network (that is, the network connection between the repeater 102_2 and the repeater 102_1 is disconnected), the repeater 102_2 will selectively turn off the external wireless transmission function of the downlink wireless transmission ports RDF_21 and RDF_22 using the front-haul service set identifier for data transmission. That is, the wireless connection between the repeater 102_2 and the user device 106_2 will be turned off.

The design of turning off the external wireless transmission function of the downlink wireless transmission ports RDB_21 and RDB_22 of the repeater 102_2 can be achieved by hiding the back-haul wireless network access ID of the downlink wireless transmission ports RDB_21 and RDB_22. The design of turning off the external wireless transmission function of the downlink wireless transmission ports RDF_21 and RDF_22 of the repeater 102_2 can be achieved by hiding the front-haul wireless network access ID of the downlink wireless transmission ports RDF_21 and RDF_22.

When the uplink connection of the repeater 102_3 is disconnected, that is, the network connection between the repeater 102_3 and the repeater 102_2 is disconnected (for example, the connection between the uplink wireless transmission ports RU_31 and RU_32 of the repeater 102_3 and the downlink wireless transmission ports RDB_21 and RDB_22 of the repeater 102_2 is disconnected), the repeater 102_3 will turn off the external wireless transmission function of the downlink wireless transmission ports RDB_31 and RDB_32. That is, the downlink connection using the back-haul service set identifier for data transmission will be turned off. When the network connection of the uplink wireless transmission ports RU_31 and RU_32 of the repeater 102_3 is disconnected, that is, the network connection between the repeater 102_3 and the repeater 102_2 is disconnected, the repeater 102_3 will selectively turn off the external wireless transmission function of the downlink wireless transmission ports RDF_31 and RDF_32 using the front-haul service set identifier for data transmission. That is, the wireless connection between the repeater 102_3 and the user device 106_3 will be disconnected.

When the connection between the uplink wireless transmission ports RU_21 and RU_22 of the repeater 102_2 and the network is restored, (for example, the wireless connection between the repeater 102_2 and the repeater 102_1 is restored), the repeater 102_2 will restore the external wireless transmission function of the downlink wireless transmission ports RDB_21 and RDB_22 and the external wireless transmission function of the downlink wireless transmission ports RDF_21 and RDF_22. That is, the wireless connection between the repeater 102_2 and the repeater 102_3 will be restored and the wireless connection between the repeater 102_2 and the user device 106_2 will also be restored. Then, when the connection between the uplink wireless transmission ports RU_31 and RU_32 of the repeater 102_3 and the downlink wireless transmission ports RDB_21 and RDB_22 of the repeater 102_2 is restored, the repeater 102_3 will restore the external wireless transmission function of the downlink wireless transmission ports RDB_31 and RDB_32 and the external wireless transmission function of the downlink wireless transmission ports RDF_31 and RDF_32. That is, the wireless connection between the repeater 102_2 and the repeater 102_3 will be restored, and the wireless connection between the wireless connection between the repeater 102_3 and the user device 106_3 will also be restored.

Figure 2C:
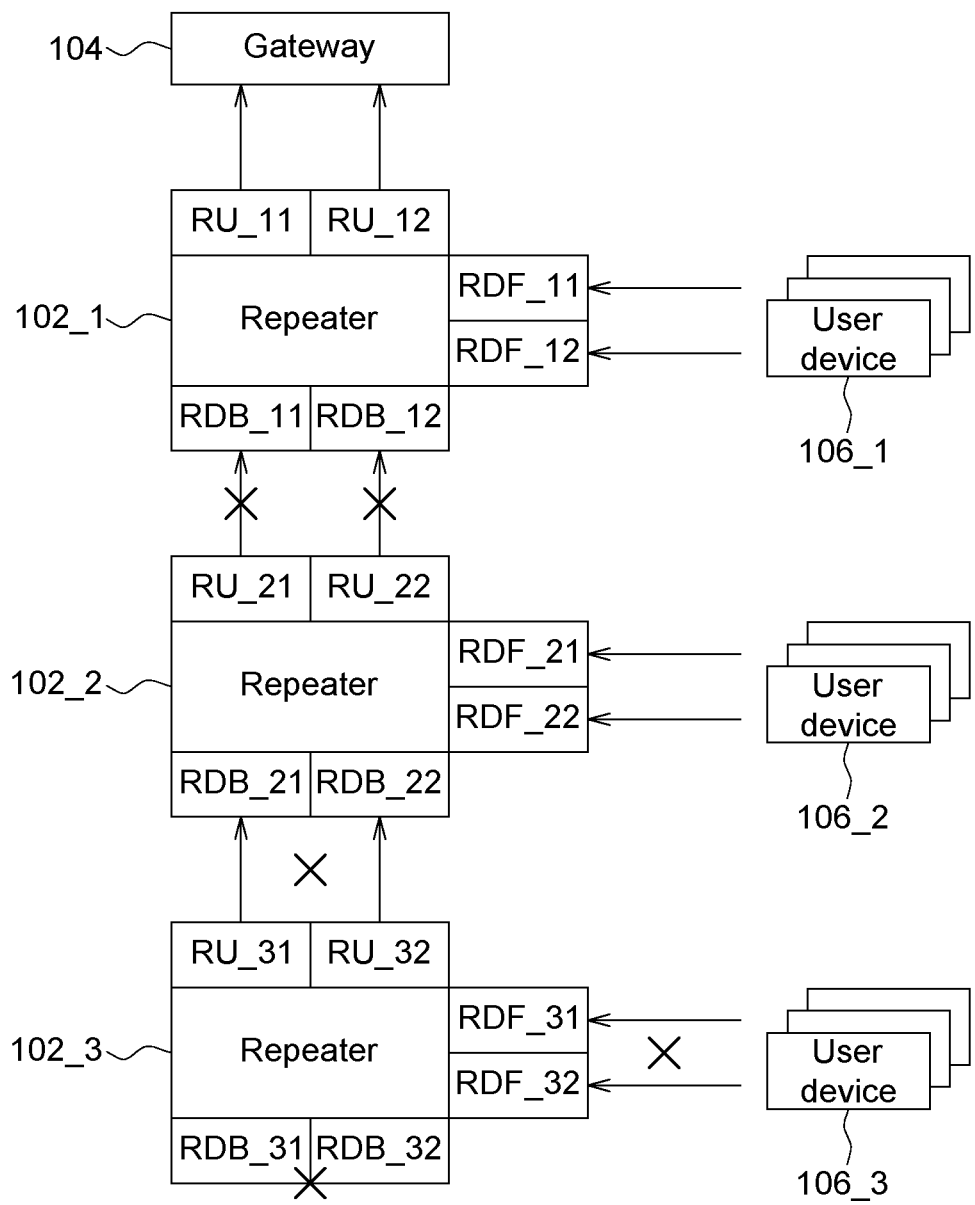
FIG. 2C is a schematic diagram of another example of the mesh network of FIG. 2A using the repeater of FIG. 1 of the present disclosure.

FIG. 2B is a schematic diagram of the repeater 102 turning off the external wireless transmission function of the downlink wireless transmission interface using the front-haul service set identifier for data transmission. FIG. 2C is a schematic diagram of the repeater 102 not turning off the external wireless transmission function of the downlink wireless transmission interface using the front-haul service set identifier for data transmission.

Referring to FIG. 2C, a schematic diagram of another example of the mesh network of FIG. 2A using the repeater of FIG. 1 of the present disclosure is shown. In the present example, descriptions common to that of FIG. 2B are not repeated. In the present example, it is assumed that the user device 106_2 has a mobile application installed therein (also referred as mobile app or APP) for managing the mesh network 100 ("mobile application", "mobile app", or "APP" is an application program designed for smart mobile phones, PC tablets, or other mobile devices). Through the APP, the user device 106_2 can obtain the topology of the mesh network 100 and the information such as which wireless clients are connected to each repeater and the strength of wireless connection between each repeater and each client. Through the APP, the user device 106_2 may determine whether a wireless client can be connected to a corresponding repeater and may set the time interval for wireless connection. Through the APP, the user device 106_2 may even control the flow of the mesh network 100. The APP exemplified in the present embodiment is for exemplary purpose only, not for limiting the present disclosure, and may only provide some of the functions disclosed above.

As indicated in FIG. 2C, when the uplink connection of the repeater 102_2 is disconnected, that is, the network connection between the repeater 102_2 and the repeater 102_1 is disconnected (for example, the connection between the uplink wireless transmission ports RU_21 and RU_22 of the repeater 102_2 and the downlink wireless transmission ports RDB_11 and RDB_12 of the repeater 102_1 is disconnected), the repeater 102_2 will turn off the external wireless transmission function of the downlink wireless transmission ports RDB_21 and RDB_22. That is, the downlink connection using the back-haul service set identifier for data transmission (that is, the network connection between the repeater 102_2 and the repeater 102_3) will be turned off.

However, in the example of FIG. 2C, the repeater 102_2 does not turn off the external wireless transmission function of the downlink wireless transmission ports RDF_21 and RDF_22 using the front-haul service set identifier for data transmission. That is, the repeater 102_2 does not turn off the wireless connection between the repeater 102_2 and the user device 106_2. This is because the user device 106_2 has been installed with an APP for managing the mesh network 10. Through the APP, the user device 106_2 still can obtain the strength of the wireless signal and the connection state of the wireless connection between the user device 106_2 and the repeater 102_2 from the wireless connection between the user device 106_2 and the repeater 102_2. Thus, even when the uplink connection of the repeater 102_2 is disconnected, the repeater 102_2 still does not turn off the wireless connection between the repeater 102_2 and the user device 106_2, such that the user device 106_2 can continue to operate or can continue to use the APP installed for managing the mesh network 100 to obtain the wireless connection state between the repeater 102_2 and the user device 106_2 and can use the APP to control the state of part of the network connected with the repeater 102_2.

Refer to FIG. 1. In some embodiments of the present embodiment, the repeater 102 includes a wired network transmission interface 109 configured to be externally connected to the network. The wired network transmission interface 109 can be an Ethernet transmission interface, which includes one or more than one Ethernet transmission port. The Ethernet transmission ports can be physically linked by the Ethernet cable to form an Ethernet link through which the repeater 102 can be connected to an external network. The processing unit 107 can be, for example, a microprocessor, a microcontroller, a chip, a circuit board, or a circuit with computing and processing function. The processing unit 107 is electrically connected to the wired network transmission interface 109, the uplink wireless transmission interface 103, and the downlink wireless transmission interface 105 for processing data transmitted from the wired network transmission interface 109, the uplink wireless transmission interface 103, and the downlink wireless transmission interface 105. The processing unit 107 can also be configured to turn off the external wireless transmission function of the downlink wireless transmission interface 105 to interrupt the downlink wireless transmission with other repeaters when the wired network transmission interface 109 and the uplink wireless transmission interface 103 both are disconnected from the network, that is, when the repeater 102 cannot be connected to the network through either wired transmission or wireless transmission.

Figure 3A:
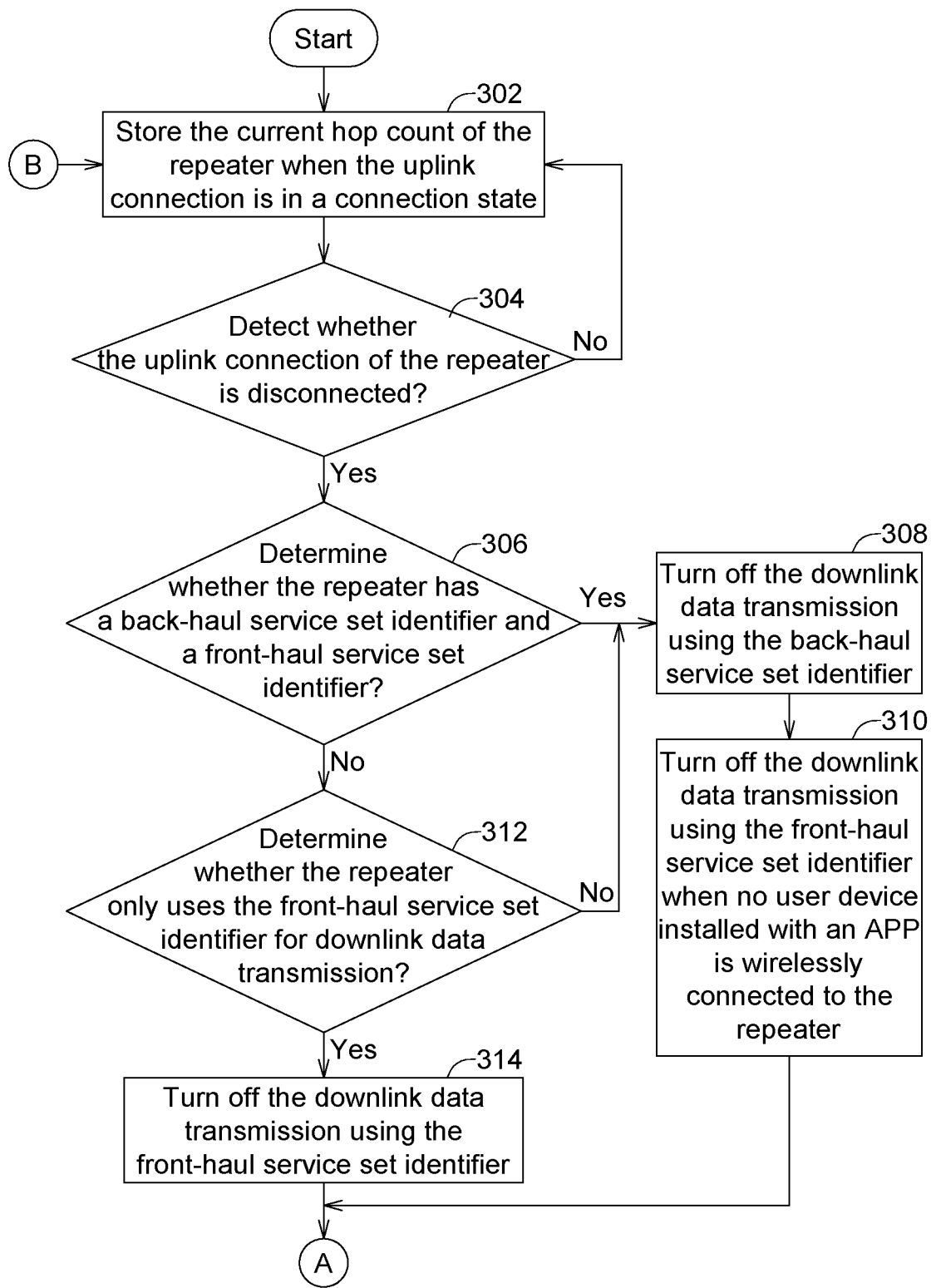
FIGS. 3A and 3B are flowcharts of a method for controlling the repeater of FIG. 1 in a mesh network according to an embodiment of the present disclosure.
Figure 3B:
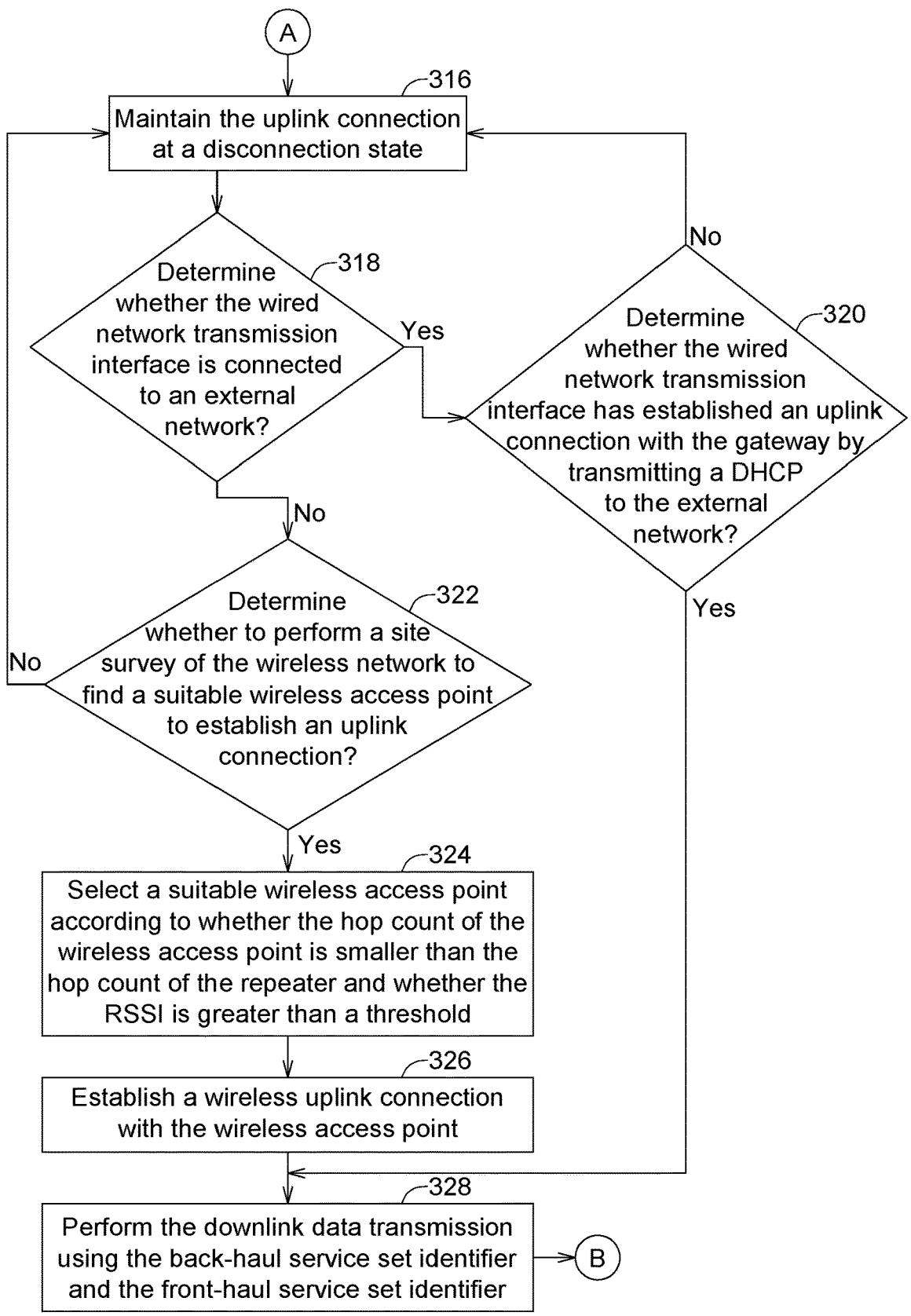

Referring to FIGS. 3A and 3B, flowcharts of a method for controlling the repeater of FIG. 1 in a mesh network according to an embodiment of the present disclosure are shown. Refer to FIG. 1. In step 302, as indicated in FIG. 3A, the current hop count of the repeater 102 is stored when the uplink connection of the repeater 102 is in a connection state.

In step 304, whether the uplink connection of the repeater 102 is disconnected is detected by the processing unit 107. If the determination result in step 304 is "Yes", which indicates that the uplink connection of the repeater 102 is disconnected from the external network, then the method proceeds to step 306. If the determination result in step 304 is "No", then the method returns to step 302. In step 306, whether the repeater 102 has a back-haul service set identifier and a front-haul service set identifier is determined by the processing unit 107.

If the determination result in step 306 is "Yes", which indicates that the downlink wireless transmission interface 105 of the repeater 102 uses the back-haul service set identifier and the front-haul service set identifier for downlink data transmission, then the method proceeds to step 308.

In step 308, the back-haul service set identifier is hidden by the processing unit 107 to turn off the downlink data transmission using the back-haul service set identifier. After step 308 is performed, the method proceeds to step 310.

In step 310, after the repeater 102 turned off the downlink data transmission of the downlink wireless transmission interface 105 using the back-haul service set identifier, the processing unit 107 turns off the downlink data transmission of the downlink wireless transmission interface 105 using the front-haul service set identifier when the user device not installed with an APP for managing the mesh network 100 is wirelessly connected to the repeater 102. In other words, the repeater 102 maintains the downlink data transmission of the downlink wireless transmission interface 105 using the front-haul service set identifier when the user device is installed with an APP for managing the mesh network 100.

If the determination result in step 306 is "No", which indicates that the downlink wireless transmission interface 105 of the repeater 102 does not concurrently perform downlink data transmission using the back-haul service set identifier and the front-haul service set identifier, then the method proceeds to step 312. In step 312, whether the downlink wireless transmission interface 105 of the repeater 102 only uses the front-haul service set identifier for downlink data transmission is determined by the processing unit 102.

If the determination result in step 312 is "Yes", which indicates that the downlink wireless transmission interface 105 of the repeater 102 only uses the front-haul service set identifier for downlink data transmission, then the method proceeds to step 314. In step 314, the downlink data transmission using the front-haul service set identifier is turned off by the processing unit 107. If the determination result in step 312 is "No", which indicates that the downlink wireless transmission interface 102 of the repeater 102 only uses the back-haul service set identifier for downlink data transmission, then the method returns to step 308. In step 308, the downlink data transmission using the back-haul service set identifier is turned off.

After step 314 is performed, the method proceeds to step 316. In step 316, the uplink connection of the repeater 102 is maintained at a disconnection state. Then, the method proceeds to step 318. In step 318, whether the wired network transmission interface 109 (such as an Ethernet transmission interface) is connected (for example, a network cable is plugged to the Ethernet transmission port) to an external network (such as the Internet) is determined by the processing unit 107.

If the determination result in step 318 is "Yes", which indicates that the wired network transmission interface 109 is connected to the external network, then the method proceeds to step 320. In step 320, whether the wired network transmission interface 109 has established an uplink connection with the gateway 104, other repeaters, or an external network through wired transmission is determined by transmitting a dynamic host configuration protocol (DHCP) to the external network by the processing unit 107. If the determination result in step 320 is "No", which indicates that the wired uplink connection of the repeater 102 maintains at a disconnection state, then the method returns to step 316. If the determination result in step 320 is "Yes", which indicates that the wired uplink connection of the repeater 102 maintains at a connection state, then the method proceeds to step 328.

If the determination result in step 318 is "No", which indicates that the wired network transmission interface 109 is not connected (for example, the network cable is not plugged to the Ethernet transmission port) to the external network (such as the Internet), then the method proceeds to step 322. In step 322, whether to perform a site survey of the wireless network to find a suitable wireless access point (such as the repeater 102 or the gateway 104) to establish an uplink connection is determined by the processing unit 107.

If the determination result in step 322 is "Yes", which indicates that site survey of the wireless network can be performed, then the method proceeds to step 324. In step 324, a suitable wireless access point (such as a repeater or a gateway) is selected by the processing unit 107 according to whether the hop count of the found wireless access point is smaller than the hop count of the repeater 102 and whether the received signal strength indicator (RSSI) of the found wireless access point is greater than a threshold.

After step 324 is performed, the method proceeds to step 326. In step 326, a wireless uplink connection with the selected wireless access point is established by the repeater 102 if the suitable wireless access point is found (the hop count of the wireless access point is smaller than the hop count of the repeater 102 and the RSSI of the received wireless signal transmitted to the repeater 102 from the wireless access point is greater than a threshold). Then, the method proceeds to step 328.

In step 328, the downlink data transmission is performed by the processing unit 107 using the back-haul service set identifier and the front-haul service set identifier. Moreover, if the determination result in step 320 is "Yes", which indicates that the uplink connection of the repeater 102 is already restored (the uplink connection can be performed in a wired manner), then the method also proceeds to step 328 to perform the downlink data transmission using the back-haul service set identifier and the front-haul service set identifier.

According to another embodiment of the present invention, a repeater for mesh network which is configured to be connected to a network is provided. The repeater includes a processing unit, an uplink wireless transmission interface and a downlink wireless transmission interface. The uplink wireless transmission interface and the downlink wireless transmission interface are controlled by the processing unit. The uplink wireless transmission interface is configured to directly establish a connection with the network or to firstly establish a back-haul connection with a first repeater and then establish a connection with the network through the first repeater. The downlink wireless transmission interface is configured to provide a back-haul wireless network access ID and a front-haul wireless network access ID. The back-haul wireless network access ID allows a second repeater to establish a back-haul connection with the downlink wireless transmission interface. The front-haul wireless network access ID allows a user device to establish a front-haul connection with the downlink wireless transmission interface. When the uplink wireless transmission interface is disconnected from the network, the processing unit hides the back-haul wireless network access ID to turn off the function of the downlink wireless transmission interface allowing the second repeater to establish the back-haul connection.

The back-haul wireless network access ID and the front-haul wireless network access ID respectively are a back-haul service set identifier and a front-haul service set identifier.

According to another embodiment of the present invention, a repeater for a mesh network is provided. The repeater includes a wired network transmission interface, an uplink wireless transmission interface, a downlink wireless transmission interface, and a processing unit. The repeater is connected to a network through the wired network transmission interface or the uplink wireless transmission interface. The downlink wireless transmission interface is configured to provide a wireless network access ID. The wireless network access ID allows another repeater to establish a back-haul connection or allows a user device to establish a front-haul connection. The processing unit is configured to hide the wireless network access ID to turn off the connection function of the downlink wireless transmission interface when the repeater is disconnected from the network. The wireless network access ID is a service set identifier.

According to a further embodiment of the present invention, a repeater configured to be connected to a network is provided. The repeater includes an uplink wireless transmission interface, a downlink wireless transmission interface, and a processing unit. The uplink wireless transmission interface is configured to directly establish an external wireless connection with the network or to firstly establish a connection with a first repeater and then establish a connection with the network through the first repeater. The downlink wireless transmission interface is configured to perform data transmission with the uplink wireless transmission interface and has the function of external wireless transmission. The processing unit is configured to turn on the external wireless transmission function of the downlink wireless transmission interface only when the uplink wireless transmission interface establishes an external wireless connection with the network or the first repeater.

The repeater, for example, may further include a wired network transmission interface configured to be externally connected to the network. The processing unit is further configured to turn on the external wireless transmission function of the downlink wireless transmission interface only when the wired network transmission interface or the uplink wireless transmission interface establishes a connection with the network.

To summarize, the repeater for a mesh network disclosed in above embodiments of the present disclosure determines whether to turn off the downlink connection of the downlink network transmission interface according to whether the uplink connection is disconnected, not only effectively preventing the mesh network from generating the phenomenon of packet looping derived from the change in the connection state of the repeaters, but also reducing the delay in packet transmission, which occurs when the connection state of the repeaters changes.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A repeater comprising:
   an uplink wireless transmission interface configured to establish an external wireless connection with a network;
   a downlink wireless transmission interface configured to perform data transmission with the uplink wireless transmission interface and having an external wireless transmission function for establishing a wireless connection with another repeater or a user device; and
   a processing unit configured to turn off the external wireless transmission function of the downlink wireless transmission interface when the uplink wireless transmission interface is disconnected from the network;

wherein the uplink wireless transmission interface and the downlink wireless transmission interface both are controlled by the processing unit;

wherein the uplink wireless transmission interface is configured to directly establish a connection with the network or to firstly establish a back-haul connection with a first repeater and then establish the connection with the network through the first repeater;

wherein the downlink wireless transmission interface is configured to provide a back-haul wireless network access ID and a front-haul wireless network access ID, the back-haul wireless network access ID allows a second repeater to establish a back-haul connection with the downlink wireless transmission interface, and the front-haul wireless network access ID allows the user device to establish a front-haul connection with the downlink wireless transmission interface;

wherein when the uplink wireless transmission interface is disconnected from the network, the processing unit hides the back-haul wireless network access ID to turn off the function of the downlink wireless transmission interface allowing the second repeater to establish the back-haul connection, wherein the back-haul wireless network access ID and the front-haul wireless network access ID respectively are a back-haul service set identifier and a front-haul service set identifier.

2. The repeater according to claim 1, further comprising:
a wired network transmission interface configured to be externally connected to the network;
wherein the processing unit is further configured to turn off the external wireless transmission function of the downlink wireless transmission interface when the wired network transmission interface and the uplink wireless transmission interface both are disconnected from the network.

3. The repeater according to claim 1, wherein the uplink wireless transmission interface and the downlink wireless transmission interface both are a Wi-Fi transmission interface.

4. The repeater according to claim 1, wherein the uplink wireless transmission interface is configured to establish an external wireless connection with the first repeater, and the downlink wireless transmission interface is further configured to provide a wireless network access ID allowing the second repeater to establish an external wireless connection with the downlink wireless transmission interface.

5. The repeater according to claim 4, wherein the wireless network access ID is a service set identifier (SSID).

6. The repeater according to claim 1, wherein the uplink wireless transmission interface is configured to establish an external wireless connection with the first repeater.

7. The repeater according to claim 1, wherein the processing unit is further configured to hide the back-haul wireless network access ID and the front-haul wireless network access ID of the downlink wireless transmission interface to turn off the external wireless transmission function of the downlink wireless transmission interface when the uplink wireless transmission interface is disconnected from the network.

8. The repeater according to claim 1, wherein the processing unit is further configured to restore the external wireless transmission function of the downlink wireless transmission interface when the connection between the uplink wireless transmission interface and the network is restored, and the repeater is adapted for a mesh network.

9. The repeater according to claim 1, wherein the repeater further comprises:
a wired network transmission interface;
wherein the repeater is connected to a network through the wired network transmission interface or the uplink wireless transmission interface;
wherein the downlink wireless transmission interface is further configured to provide a wireless network access ID allowing another repeater to establish a back-haul connection or allowing the user device to establish the front-haul connection; and
wherein the processing unit is further configured to hide the wireless network access ID for the back-haul connection, and to turn off the connection function of the downlink wireless transmission interface when the connection between the repeater and the network is disconnected.

10. The repeater according to claim 9, wherein the wireless network access ID is a service set identifier.

11. The repeater according to claim 1, wherein
the processing unit is further configured to turn on the external wireless transmission function of the downlink wireless transmission interface only when the uplink wireless transmission interface establishes the external wireless connection with the network or the first repeater.

12. The repeater according to claim 11, further comprising:
a wired network transmission interface configured to be externally connected to the network;
wherein the processing unit is further configured to turn on the external wireless transmission function of the downlink wireless transmission interface only when the wired network transmission interface or the uplink wireless transmission interface establishes the connection with the network.

* * * * *